United States Patent Office 3,600,456
Patented Aug. 17, 1971

3,600,456
PRODUCTION OF $C_7$–$C_{20}$ OLEFINS
Christopher Patrick Cadman Bradshaw, Sunbury-on-Thames, Middlesex, England, assignor to The British Petroleum Company Limited, London, England
No Drawing. Filed Dec. 5, 1968, Ser. No. 781,616
Claims priority, application Great Britain, Jan. 8, 1968, 1,050/68
Int. Cl. C07c 3/62
U.S. Cl. 260—683D                      12 Claims

ABSTRACT OF THE DISCLOSURE $C_{7-20}$ olefins are prepared by contacting olefins of carbon number $C_3$ or higher with a disproportionation catalyst comprising rhenium heptoxide or rhenium carbonyl supported on a metal oxide, and an isomerisation catalyst e.g. potassium on alumina.

---

This invention relates to a process for the production of $C_7$–$C_{20}$ olefins.

According to the present invention theer is provided a process for the production of $C_7$–$C_{20}$ olefins which process comprises contacting an olefin or mixture of olefins of carbon number $C_3$ or greater with a disproportionation catalyst comprising rhenium heptoxide or rhenium carbonyl supported on a metal oxide and an isomerisation catalyst under such conditions of temperature and pressure that disproportionation and isomerisation take place.

The disproportionation catalyst may be, for example, rhenium heptoxide supported on alumina as disclosed in Great Britain Pat. No. 1054864, rhenium heptoxide supported on a refractory element of Group IV disclosed in British Pat. No. 1,093,784; rhenium heptoxide supported on iron oxide ($Fe_3O_4$), cobalt oxide (CoO), nickel oxide (NiO) or tungsten oxide ($WO_3$) disclosed in British Pat. No. 1,096,250, or rhenium carbonyl on alumina.

The isomerisation catalyst may be any of those known in the art for the isomerisation of olefins. Suitable catalysts are, for example, alumina, silica-alumina, potassium on alumina, sulphided nickel on sepiolite or silica treated with magnesium $Mg^{2+}$ ions.

The preferred isomerisation catalyst is potassium on alumina.

The isomerisation and disproportionation catalysts may be mixed, in which case they both operate at the same temperature, or they may be separate such that there are alternate beds of each catalyst, the reaction temperature of each catalyst may then be different. A catalyst may be used which performs both functions simultaneously e.g., potassium on $Re_2O_7 \cdot Al_2O_3$ at 0°–100° C.

Preferably the disproportionation and isomerisation are effected in a first reaction zone and the reaction products from the first zone containing unreacted feed passed to a second zone. In the second zone the mixture is heated and the vapour passed through a condenser, products of lower carbon number pass through the condenser and are vented off, unreacted feed is condensed and returned to the first reaction zone and products of higher carbon number are retained in the second zone.

One or more recycle apparatuses may be employed. In the latter case the heavy components from one apparatus may be transferred to a succeeding one and the lighter components to a preceding one. Thus it is possible to raise both conversion and selectivity.

The reaction temperature depends on the catalyst or catalysts used, the composition of the feed and the desired products. For rhenium containing catalysts suitable disproportionation temperatures are in the range −30° C. to +400° C. preferably 20–100° C. The isomerisation, if independent of the disproportionation may be carried out at between −60° and +600° C.

Reaction pressures may be in the range 10 mm. of Hg to 2000 p.s.i.g. Preferably the pressure is such that reactants are mainted in the liquid phase.

The L.H.S.V. of recycle over the catalyst may vary from 0.01 to 100 preferably from 2 to 20 vol./vol./h.

Suitable linear olefin starting materials are n-butenes, n-pentenes, n-hexanes, n-heptenes, n-octenes etc. or mixtures thereof.

For the production of heavy linear olefins in the $C_7$–$C_{20}$ range any feed containing linear olefins of carbon number $C_3$ or above may be used. If high molecular weight branched chain olefins are required then the feed may contain a proportion of branched material e.g., isobutene, 2-methylbutene-2 or 3-methylpentene-2.

A mixture containing the feed e.g., n-butenes together with products of disproportionation and isomerisation e.g., pentene-1, pentene-2 and propylene, may be circulated from a reaction zone into a reboiler and be distilled in a column. The butenes are condensed in a condenser connected to the top of the column and are returned to the reaction zone, The heavier products of disproportionation of the feed e.g., pentenes are collected in the reboiler and the lighter components e.g., propylene are taken from the condenser. If the feed is n-butene, then this is gradually consumed and the temperature in the reboiler rises until $C_5$ olefins are being circulated. When the butenes have been almost totally consumed the temperature of the circulating liquid in the condenser is raised to allow any butenes subsequently made to escape. As the reaction proceeds the temperature at the still head rises. The reaction is complete when this temperature reaches the boiling point of the lowest boiling olefin in the required range.

The invention is illustrated but not limited by the following examples.

EXAMPLE 1

The reaction conditions were as follows:

Catalyst:
   20 mls. of 10% wt. $Re_2O_7 \cdot Al_2O_3$
   20 mls. of 3% wt. $K.Al_2O_3$. The $K.Al_2O_3$ catalyst was prepared by contacting molten potassium with Spence "H" alumina (surface area 120 m.$^2$/g., 0.5 percent by weight Na$^+$) at 200° C.
Feed: n-butenes 500 ml.
Reaction temperature ° C.: 0–40
Total recycle time h.: 9

The analysis of products is given in the following table.

| Linear olefin carbon No... | 6 | 7 | 8 | 9 | 10 | 11 | 12 | 13 | 14 | 15 | 16 | 17 | 18 | 19 |
|---|---|---|---|---|---|---|---|---|---|---|---|---|---|---|
| Yield, percent wt. of feed | 0.8 | 0.8 | 1.2 | 2.6 | 2.4 | 2.1 | 1.6 | 1.3 | 1.0 | 1.7 | 0.5 | 0.4 | 0.4 | 0.1 |

The remaining 83.3% of the product consisted of (in order of magnitude) $C_3H_6$, $C_4H_{10}$, $C_6H_{12}$.

A typical reaction sequence is as follows:

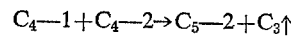

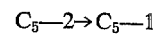

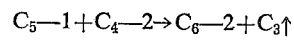

$C_6\text{—}2 \to C_6\text{—}3$ $C_6\text{—}3 + C_6\text{—}2 \to C_7\text{—}3 + C_5\text{—}2$ $C_7\text{—}3 \to C_7\text{—}2$ $C_7\text{—}3 + C_7\text{—}2 \to C_9\text{—}4 + C_5\text{—}2$ $C_9\text{—}4 + C_7\text{—}2 \to C_{10}\text{—}5 + C_6\text{—}3$ etc.

EXAMPLE 2

Catalyst:
   20 ml. of 10 percent weight $Re_2O_7 \cdot Al_2O_3$
   20 ml. of 3 percent weight $K \cdot Al_2O_3$ Feed:
   Pentene-2 (78 percent weight)
   Hexene-3 (22 percent weight)

Reaction temp. ° C.: 25

Recycle time h.: 5

Products: Percent wt.

| | |
|---|---:|
| $<n\text{-}C_7H_{14}$ | 65.6 |
| $n\text{-}C_7H_{14}$ | 3.0 |
| $n\text{-}C_8H_{16}$ | 3.0 |
| $n\text{-}C_9H_{18}$ | 2.5 |
| $n\text{-}C_{10}H_{18}$ | 2.1 |
| $n\text{-}C_{11}H_{22}$ | 2.0 |
| $n\text{-}C_{12}H_{24}$ | 4.8 |
| $n\text{-}C_{13}H_{26}$ | 6.1 |
| $n\text{-}C_{14}H_{28}$ | 3.9 |
| $n\text{-}C_{15}H_{30}$ | 2.3 |
| $n\text{-}C_{16}H_{32}$ | 2.2 |
| $n\text{-}C_{17}H_{34}$ | 1.0 |
| $n\text{-}C_{18}H_{36}$ | 0.7 |
| $n\text{-}C_{19}H_{38}$ | 0.5 |
| $n\text{-}C_{20}H_{40}$ | 0.3 |

EXAMPLE 3

Feed: Butene-2 99.8%

LHSV: 3

Catalyst Bed: Fixed

Reaction Temp. ° C.: 20

Pressure p.s.i.g.: 100

| Catalyst | Conversion percent wt. | Products percent wt. | | | | |
|---|---|---|---|---|---|---|
| | | $C_2H_4$ | $C_3H_6$ | $C_4H_8$ | $C_5H_{10}$ | $C_6H_{12}$ |
| Mixed bed of 10% $Re_2O_7.Al_2O_3$ (40 ml.) 1% $K.Al_2O_3$ (20 ml.) | 31.7 | 0.2 | 14.4 | 68.3 | 14.1 | 3.0 |
| 10% $Re_2O_7.Al_2O_3$ (40 ml.) | <0.2 | | <0.1 | 99.8 | <0.1 | |

EXAMPLE 4

Feed:
   Pentene-2 69%
   Hexene-3 31%

LHSV: 6

Reaction Temperature ° C.: 25

Pressure: Atmospheric

| Catalyst | Conversion,[1] percent wt. | Products (olefins), percent wt. | | | | | | | | | |
|---|---|---|---|---|---|---|---|---|---|---|---|
| | | $C_3$ | $C_4$ | $C_5$ | $C_6$ | $C_7$ | $C_8$ | $C_9$ | $C_{10}$ | $C_{11}$ | $C_{12}$ |
| Mixed bed of 10% $Re_2O_7.Al_2O_3$ (6 ml), and 1% $K.Al_2O_3$ (2 ml) | 54.4 | 1.4 | 25.4 | 23.3 | 22.2 | 13.5 | 7.7 | 3.7 | 1.8 | .08 | 0.2 |
| Separate consecutive beds: 1% $K.Al_2O_3$ (2 ml), and 10% $Re.Al_2O_3$ (6 ml) | 33.8 | 0.4 | 15.7 | 32.9 | 33.3 | 14.7 | 3.0 | | | | |
| Separate consecutive beds: 1% $K.Al_2O_3$ (1 ml.), 10% $Re_2O_7.Al_2O_3$ (3 ml.), 1% $K.Al_2O_3$ (1 ml.), 10% $Re_2O_7.Al_2O_3$ (3 ml.) | 46.8 | 0.5 | 25.0 | 26.4 | 21.8 | 16.2 | 7.3 | 2.2 | 0.6 | | |
| 10% $Re_2O_7.Al_2O_3$ | 10.1 | | | 10.1 | 43.9 | 46.0 | | | | | |

[1] Conversion of olefins of C No. > and < that of the feed.

I claim:

1. A process for the production of $C_7$–$C_{20}$ olefins which comprises contacting at least one olefin of carbon number $C_3$ or greater with a catalyst comprising a mixture of (a) potassium on alumina and (b) rhenium heptoxide or rhenium carbonyl supported on a metal oxide, under such conditions of temperature and pressure that disproportionation and isomerisation take place.

2. A process as in claim 1 wherein catalyst component (b) is rhenium heptoxide supported on alumina.

3. A process as in claim 1 wherein only one olefin is contacted with the catalyst.

4. A process as in claim 1 wherein a mixture of olefins is contacted with the catalyst.

5. A process as in claim 1 wherein the catalyst consists essentially of potassium, rhenium heptoxide and alumina.

6. A process according to claim 1 wherein disproportionation is effected at a temperature in the range —30° C. to +400° C.

7. A process according to claim 6 wherein disproportionation is effected at a temperature in the range 20° C. to 100° C.

8. A process according to claim 1 wherein isomerisation is carried out at a temperature in the range —60° C. to +600° C.

9. A process according to claim 1 wherein disproportionation and isomerisation are effected at a temperature in the range 0° C. to 100° C.

10. A process acording to claim 1 wherein the reaction pressure is in the range 10 mm. mercury to 2000 p.s.i.g.

11. A process according to claim 10 wherein the pres- liquid phase.

12. A process according to claim 1 wherein the olefin feedstock comprises n-butene, n-pentene, n-hexene, n-heptene, or n-octene.

References Cited

UNITED STATES PATENTS

| | | | |
|---|---|---|---|
| 3,393,251 | 7/1968 | Fenton | 260—683.15 |
| 3,448,163 | 6/1969 | Howman et al. | 260—683 |
| 3,485,889 | 12/1969 | Williams et al. | 260—683 |

FOREIGN PATENTS

| | | | |
|---|---|---|---|
| 6,608,427 | 12/1967 | Netherlands | 260—683 |

DELBERT E. GANTZ, Primary Examiner

C. E. SPRESSER, Jr., Assistant Examiner

PO-1050
(5/69)

UNITED STATES PATENT OFFICE
CERTIFICATE OF CORRECTION

Patent No. 3,600,456          Dated August 17, 1971

Inventor(s) Christopher Patrick Cadman Bradshaw

It is certified that error appears in the above-identified patent and that said Letters Patent are hereby corrected as shown below:

Column 2, line 64, "$C_3H_6$, $C_4H_{10}$, $C_6H_{12}$" should read -- $C_3H_6$, $C_4H_8$, $C_5H_{10}$, $C_6H_{12}$ -- . Column 4, line 53, "A process according to claim 10 wherein the presliquid phase" should read -- A process according to claim 10 wherein the pressure is such that the reactants are maintained in the liquid phase -- .

Signed and sealed this 21st day of March 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,600,456      Dated August 17, 1971

Inventor(s) Christopher Patrick Cadman Bradshaw

It is certified that error appears in the above-identified patent and that said Letters Patent are hereby corrected as shown below:

Column 3, line 40

"n-$C_{10}H_{18}$" should read as follows --n-$C_{10}H_{20}$--

Signed and sealed this 6th day of June 1972.

(SEAL)
Attest:

EDWARD M. FLETCHER, JR.
Attesting Officer

ROBERT GOTTSCHALK
Commissioner of Patents